United States Patent Office 3,796,617
Patented Mar. 12, 1974

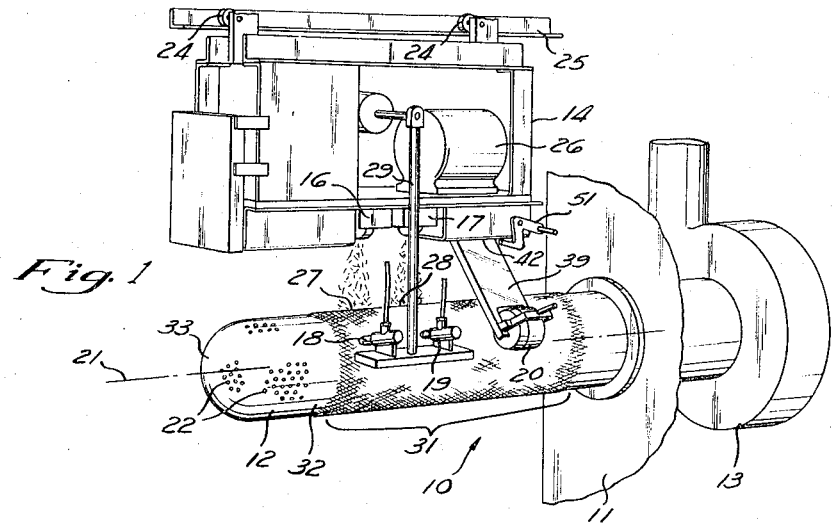
Fig. 1
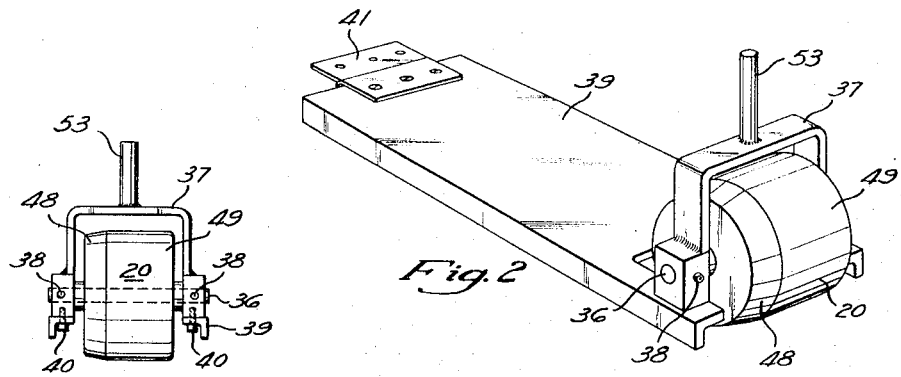
Fig. 2
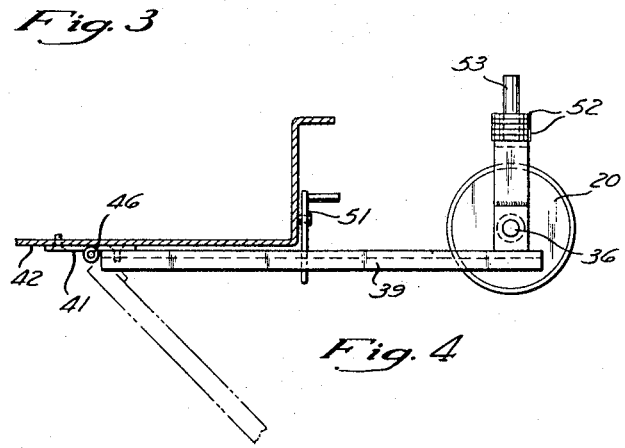
Fig. 3
Fig. 4

3,796,617
METHOD FOR MAKING FIBROUS PREFORM
Arthur J. Wiltshire, Cleveland, Ohio, assignor to Structural Fibers, Inc., Chardon, Ohio
Original application June 5, 1970, Ser. No. 43,736, now Patent No. 3,674,599. Divided and this application Apr. 6, 1972, Ser. No. 241,758
Int. Cl. B32b 5/16
U.S. Cl. 156—62.2                                    3 Claims

ABSTRACT OF THE DISCLOSURE

A method and apparatus for manufacturing an improved fiber preform which may be used in the subsequent bag molding of fiber reinforced plastic articles such as tanks or the like. The method comprises the steps of randomly depositing short reinforcing fibers on a form, binding the fibers together with a settable resin binder, and rolling the resin coated fibers on the form into a dimensionally uniform porous mat. The apparatus includes a rotatable lay-up form, means for randomly depositing the reinforcing fibers in a porous layer on the form, means to coat the fibers with a settable resin binder, and means to progressively press the fibers along the length of the form into a uniform wall thickness.

This application is a division of application Ser. No. 43,736, now U.S. Pat. No. 3,674,599.

BACKGROUND OF THE INVENTION

A fiber preform is an article having the general shape of an article to be subsequently molded and consists of a porous wall formed by a multitude of randomly oriented short lengths of fibers which are bonded together by a settable resin. Fiber preforms are used in the manufacture of hollow articles such as tanks by positioning them in a mold, compressing them internally by inflating a bag therein, and then impregnating them with a thermosetting resin. Earlier methods of preform use are described in United States Letters Patent to Wiltshire 3,138,507, and Geringer 3,137,898. Under these earlier methods, the preform was a composite of one or two end preforms and a cylindrically rolled blanket side wall. One of the deficiencies of this composite method is the overlapping joint structure where an end preform abuts the cylindrically rolled blanket or where the ends of the blanket longitudinally abut each other. Overlapping may create an irregularity in the amount of reinforcing material at a joint and may not provide uniform interlocking of the reinforcing fibers at the joint. It is, therefore, a desired molding practice to minimize the number of joints in the preforms and maintain uniformity in wall thickness throughout the preform.

An improved preform with a machine and method for making the same is disclosed in my copending joint United States patent application Fiber Preform and Method and Apparatus for Making Same, Ser. No. 742,-692, filed July 5, 1968, now U.S. Pat. No. 3,654,002. According to the teachings of that patent, a preform may be produced by depositing or laying up short reinforcing fibers on a form having a cylindrical portion and an end portion while spraying a resin binder thereon which, when subsequently cured, produces a rigid porous preform. Each preform produced according to that invention may be combined with a similar preform within a mold so that a molded article may be formed which has only one preform joint.

In producing fiber preforms in accordance with the teachings of the aforementioned U.S. Pat. No. 3,654,002, it is important that those preforms satisfy rigid dimensional requirements. In particular, the exterior dimensions of the preform must be substantially equal to the interior dimensions of the mold to be used and lie within a narrow tolerance range.

If the preform is oversized, it cannot be inserted into the mold and must be discarded. There is no economical way to reshape the preform after the binding resin has set, nor is there a method of salvaging the materials forming the preform. Consequently, valuable products, time, and materials are lost.

SUMMARY OF THE INVENTION

The present invention represents an improvement in the method and apparatus of my joint invention disclosed in the aforementioned U.S. Pat. No. 3,654,002. The improvement comprises, basically, rolling or pressing the fiber preform with a roller before it is removed from the lay-up form on which it is deposited and before the binder resin has set to any significant degree. This rolling action produces a fiber preform having a dimensionally uniform outside diameter so that the preform may be readily inserted into the mold.

As described in my copending joint application, short reinforcing fibers are randomly deposited on a rotating form and are simultaneously sprayed with a resin binder to form the porous walls of a preform. The wall thickness is generally controlled by the volume of fibers deposited along the length of the form. In the embodiment shown therein, the fiber volume is regulated by the transport rate of a carriage conveying a source of fibers and the rate at which the source produces fibers. With the apparatus disclosed in my copending joint application, fibers are directed from the source to the lay-up form under the influence of the propelling force of the fiber source and a vacuum applied internally to the form. As a precaution to insure wall uniformity, the source of fibers comprises two filament choppers, one leading the other as the carriage traverses the form. This duplication is intended to even out the random nature of the fiber deposition.

To further improve the uniformity of wall thickness, the present invention provides a roller in rolling contact with the fibers deposited on the rotating form. In the preferred embodiment the roller is relatively short in comparison to the length of the lay-up form and it is mounted on the carriage for movement therewith. The roller closely follows the zone at which fibers are deposited and sprayed so that they may be rolled before the resin binder has set.

This method of pressing or rolling the preform as it is being formed results in a more uniform or dimensionally accurate wall thickness which in turn permits the manufacture of quality fiber reinforced articles. By maintaining accurate wall thickness the preform may be dimensioned to fit with minimal clearance between its outer surface and the inner surface of a mold. The accurately rolled preform may be uniformly compressed within the mold and impregnated with resin without producing harmful resin rich areas.

BRIEF DESCRIPTION OF THE DRAWINGS

FIG. 1 is a fragmentary perspective view of a machine incorporating this invention.
FIG. 2 is a perspective view, on an enlarged scale, of the preform roller of this invention.
FIG. 3 is a side elevational view showing the rolling surface of the preform roller.
FIG. 4 shows an end elevational view of the mounting arrangement provided for the preform roller.

DESCRIPTION OF THE PREFERRED EMBODIMENT

In accordance with the present invention, FIG. 1 shows a machine 10 having as its principal parts a frame or housing 11, a lay-up form 12, a suction blower or fan 13, and a carriage 14. On the carriage 14 is mounted a source of fibers comprising a pair of conventional filament cutters or choppers 16 and 17, a corresponding pair of binder spray nozzles 18 and 19, and a preform roller 20. A more detailed description of other parts of the machine 10 may be found in U.S. Pat. No. 3,654,002, mentioned above.

The lay-up form 12 is an elongated cylindrical member suitably journaled in bearings (not shown) mounted on the frame 11 and suitably driven about a horizontal longitudinal axis 21 by a motor (also not shown). The form 12 is hollow and is provided with a multitude of perforations or holes 22 in its exterior surface. The hollow interior of the form 12 is connected to the vacuum fan 13 to thereby draw air through the perforations 22 into the interior of the form 12.

The carriage 14 translates along a path above the form 12 and parallel to the longitudinal axis 21 of the form. A set of rollers or wheels 24 support the carriage 14 on a guide rail 25 mounted on the frame 11 above the form 12. The two choppers 16 and 17 are mounted on the lower side of the carriage 14 and are spaced apart along the longitudinal direction of the form 12. The choppers 16 and 17, rotably driven by a common motor 26 and separate clutches (not shown), operate to cut or chop continuous filaments of glass fiber or other reinforcing fibers into short lengths and direct these cut pieces downwardly against the form 12 as illustrated at zones 27 and 28. The fibers are randomly deposited on the form 12 and held in position by the suction applied to the perforations 22 by the fan 13.

An arm 29 depending from the carriage 14 supports the spray nozzles 18 and 19 adjacent the areas or zones 27 and 28 at which chopped fibers are being deposited. The spray nozzles 18 and 19 are adapted to spray settable resin binder in the areas in which the cutters 16 and 17, respectively, deposit cut fibers. The lay-up form 12 is provided with a cylindrical sidewall portion 32 and an end portion 33. Fibers are deposited and sprayed along the length of the cylindrical portion 32 and over the end portion 33 of the form. The portions 32 and 33 have the same general configuration as a portion of the eventual article into which the preform will be molded.

As viewed in FIG. 1, the carriage 14 traverses along its path from right to left. Suitable control circuitry is provided to first operate the leftward cutter 16 and spray nozzle 18. After sufficient fibers have been deposited and sprayed in a layer on the form 12 at the beginning or rightward end of a sidewall portion 31 of a fiber preform, carriage movement may be initiated. Upon movement of the carriage 14 to the left, the rightward chopper 17 and spray nozzle 19 are operated to add a second course or layer of resin coated fibers to the sidewall portion 31. This double application of resin coated fibers insures that the resulting fiber mat wall will be relatively uniform in thickness. The fibers are deposited and sprayed in such a manner as to leave sufficient voids between individual fibers to form a porous and somewhat compressible mat which may be subsequently impregnated with a thermosetting resin during the molding operation.

To improve the uniformity of wall thickness and density of the preform, the present invention provides the preform roller 20 to roll or press the sidewall extent of the fiber preform while it is on the form 12. In the preferred embodiment the preform roller 20 is mounted on the carriage 14 slightly behind or rearward of the zones or areas 27 and 28 where fibers are being deposited and sprayed with resin binder. It may be seen, of course, that the roller 20 will closely follow these areas 27 and 28 as the carriage 14 traverses the form 12.

The preform roller 20 is rotatably mounted on a shaft 36 which in turn is secured in a yoke 37 with a pair of set screws 38. The yoke 37 is positioned on a channel or arm 39 with a pair of screws 40. The arm 39 is mounted on a hinge 41 which is secured to a lower surface 42 of the carriage 14. The hinge 41 and the arm 39 are adapted to permit the roller 20 to engage the preform sidewall portion 31 when the arm 39 is approximately 45° from the horizontal. The roller 20 is permitted by its hinge mounting to move radially towards or away from the longitudinal axis 21 of the form 12 to accommodate variations in the diameter of various forms employed on the machine 10.

As may be seen, the pivot or axis 46 of the hinge 41 is mounted parallel to the longitudinal axis 21 of the form 12 so that the arm 39 moves in planes perpendicular to the longitudinal axis 21. Similarly, the roller shaft 36 is arranged parallel to the longitudinal axis 21 of the form so that the roller 20 is easily rotated by frictional contact with the sidewall portion 31 as the form 12 rotates. In some instances it may be desirable to skew the preform roller 20 slightly relative to the longitudinal axis 21 of the form to bring its axis perpendicular to a lead angle determined by the relative rotational speed of the form 12 and the transport speed of the carraige 14, but in most instances this has been found unnecessary. This can be effectively done by elongating one of the holes in the arm 39 associated with one of the screws 40 attaching the yoke 37 to the arm 39.

A bevel 48 is provided on the left end or face of the roller 20 to guide stray fibers under its rolling surface 49. Normally, the roller 20 engages the sidewall portion 31 only as the carriage 14 moves to the left as shown in FIG. 1. It is not necessary to roll the fibers which cover the end portion 33 of the form 12 since they will conform to the interior of a mold in which the preform will be positioned. On the rightward return of the carriage 14, the preform rolle 20 may be manually retracted upward and the channel or arm 39 may be locked in an upward position, as shown in FIG. 4, by a latch 51. To adjust the contact pressure of the roller 20 on the sidewall portion 31, a suitable number of washers or weights 52 may be positioned on a pin 53 welded to the yoke 37.

Since the preform roller 20 moves with the source of fibers and the source of resin binder, the fiber mat may be rolled before the binder sets and the fiber mat becomes rigid. Because the roller 20 floats radially with respect to the axis 21 of the form 12 and because of its relatively short length in relation to the length of the form 12, the roller adjusts for any eccentricity or other misalignment of the form 12 relative to the frame 11 or carriage guide rail 25. As mentioned, the roller is effective to flatten stray fibers and tends to level out random variations in the thickness of the fiber mat. Thus a preform may be manufactured to relatively close tolerances. The nominal dimensions of the preform may accordingly be chosen close to the interior dimensions of a mold in which it will be subsequently processed without causing problems of interference during insertion into the mold. Further, the density of the sidewall portion of the preform may be regulated by choosing the proper contact pressure, without destroying the porosity of the fiber mat. After the fiber mat has been rolled it may be cured in an oven and then removed from the form 12.

Although a preferred embodiment of this invention is illustrated, it is to be understood that various modifications and rearrangements of parts may be resorted to without departing from the scope of the invention disclosed and claimed herein.

What is claimed is:

1. A method of manufacturing a preform for a fiber reinforced hollow article which comprises the steps of depositing a large number of randomly oriented short pieces of reinforcing fiber on a form having the general configuration of the article to be formed, binding said reinforcing fibers together with a settable resin binder without filling the voids between said fibers, and progressively pressing said fibers between said form and a surface in a spiral path from one end of said form to the other to produce a dimensionally uniform wall before said binder has set while maintaining the voids between said fibers.

2. A method of manufacturing a preform for a fiber reinforced article which comprises the steps of depositing a large number of randomly oriented short pieces of reinforcing fiber on an elongated form having the general configuration of the article to be formed, binding said reinforcing fibers together with a settable resin binder without filling the voids between said fibers, and, while the form rotates about a longitudinal axis, progressively compacting said fibers in a spiral path with a surface in rolling contact therewith from one end of said form to the other into a dimensionally uniform layer.

3. A method of manufacturing a preform for a fiber reinforced article comprising the steps of applying a suction internally to perforations in the exterior surface of an elongated form rotating about its longitudinal axis, simultaneously depositing a large number of randomly oriented short reinforcing fibers from a source moving relative to said form along said longitudinal axis to form a porous fiber layer, spray coating a settable resin binder on said fibers with a spray nozzle moving with said source, and, before the resin has set, progressively pressing said fiber layer in a spiral path into a level preform wall with a roller moving with said source and said nozzle relative to said form along said longitudinal axis while maintaining the porosity of said preform, said roller being relatively short relative to the axial extent of said form.

References Cited
UNITED STATES PATENTS

| | | | |
|---|---|---|---|
| 3,654,002 | 4/1972 | Wiltshire | 156—62.4 |
| 3,379,591 | 4/1968 | Bradley | 156—425 |
| 2,990,004 | 6/1961 | Sowers et al. | 425—80 |

DANIEL J. FRITSCH, Primary Examiner

U.S. Cl. X.R.

156—62.4, 285; 264—90, 91, 109, 128